United States Patent [19]
Baugh et al.

[11] Patent Number: 5,150,379
[45] Date of Patent: Sep. 22, 1992

[54] SIGNAL PROCESSING SYSTEM FOR ADAPTIVE EQUALIZATION

[75] Inventors: Richard A. Baugh, Palo Alto; Ran-Fun Chiu, Los Altos, both of Calif.; Darlene L. Hart, Atlanta, Ga.; Merban Jam, Fremont; Sui-hing Leung, Cupertino, both of Calif.

[73] Assignee: Hewlett-Packard Company, Palo Alto, Calif.

[21] Appl. No.: 766,692

[22] Filed: Sep. 27, 1991

[51] Int. Cl.⁵ .............................................. H03H 7/30
[52] U.S. Cl. ......................................... 375/14; 375/94; 375/101
[58] Field of Search .................... 375/12, 14, 18, 94, 375/99, 101; 333/18; 360/39, 40; 364/724.19, 724.2

[56]         References Cited
         U.S. PATENT DOCUMENTS

| | | | |
|---|---|---|---|
| 4,580,176 | 4/1986 | Graves et al. | 360/45 |
| 4,789,994 | 12/1988 | Randall et al. | 375/12 |
| 4,821,288 | 4/1989 | Peile | 375/11 |
| 4,821,289 | 4/1989 | Peile | 375/14 |
| 4,853,802 | 8/1989 | Kukson et al. | 360/65 |
| 4,866,736 | 9/1989 | Bergmans | 375/18 |
| 4,870,657 | 9/1989 | Bergmans et al. | 375/14 |
| 4,905,254 | 2/1990 | Bergmans | 375/14 |
| 5,003,555 | 3/1991 | Bergmans | 375/12 |
| 5,031,194 | 7/1991 | Crespo et al. | 375/101 |

OTHER PUBLICATIONS

Roth, Max, "Mass Storage Gets New Boost," *Electronics Week*, Apr. 8, 1985, pp. 55-59.
Qureshi, Shahid, "Adaptive Equalization," *IEEE Communications Magazine*, Mar. 1982, pp. 9-16.

*Primary Examiner*—Stephen Chin

[57]           ABSTRACT

Signal processing system for reducing error due to intersymbol interference and other noise, the system having a feedforward equalizer adaptively responsive to a first error signal ($e_n$) and having a noise decorrelator adaptively responsive to an adjusting signal ($q_n$) derived from the first error signal. In a preferred embodiment the source of the signal ($S_n$) is a magnetic disk having encoded data thereon. The feedforward equalizer reduces intersymbol interference. A decision device connected to the feedforward equalizer is coupled to connect the signal ($X_n$) from the feedforward equalizer into a stream ($d_n$) of data samples having a limited number of predetermined signal levels. The first error signal is the difference between signal levels of data samples in the stream and the output of the feedforward equalizer. The first error signal is utilized to adjust the feedforward equalizer and to provide an input to the noise decorrelator. The noise decorrelator is an adaptive multi-tap assembly having a summing junction at the decorrelator output to provide a predicted noise signal ($e_{pn}$) to the output signal of the feedforward equalizer. The adjusting signal which adaptively adjusts tap weights of the noise decorrelator is the difference between the first error signal and the predicted noise signal.

16 Claims, 4 Drawing Sheets

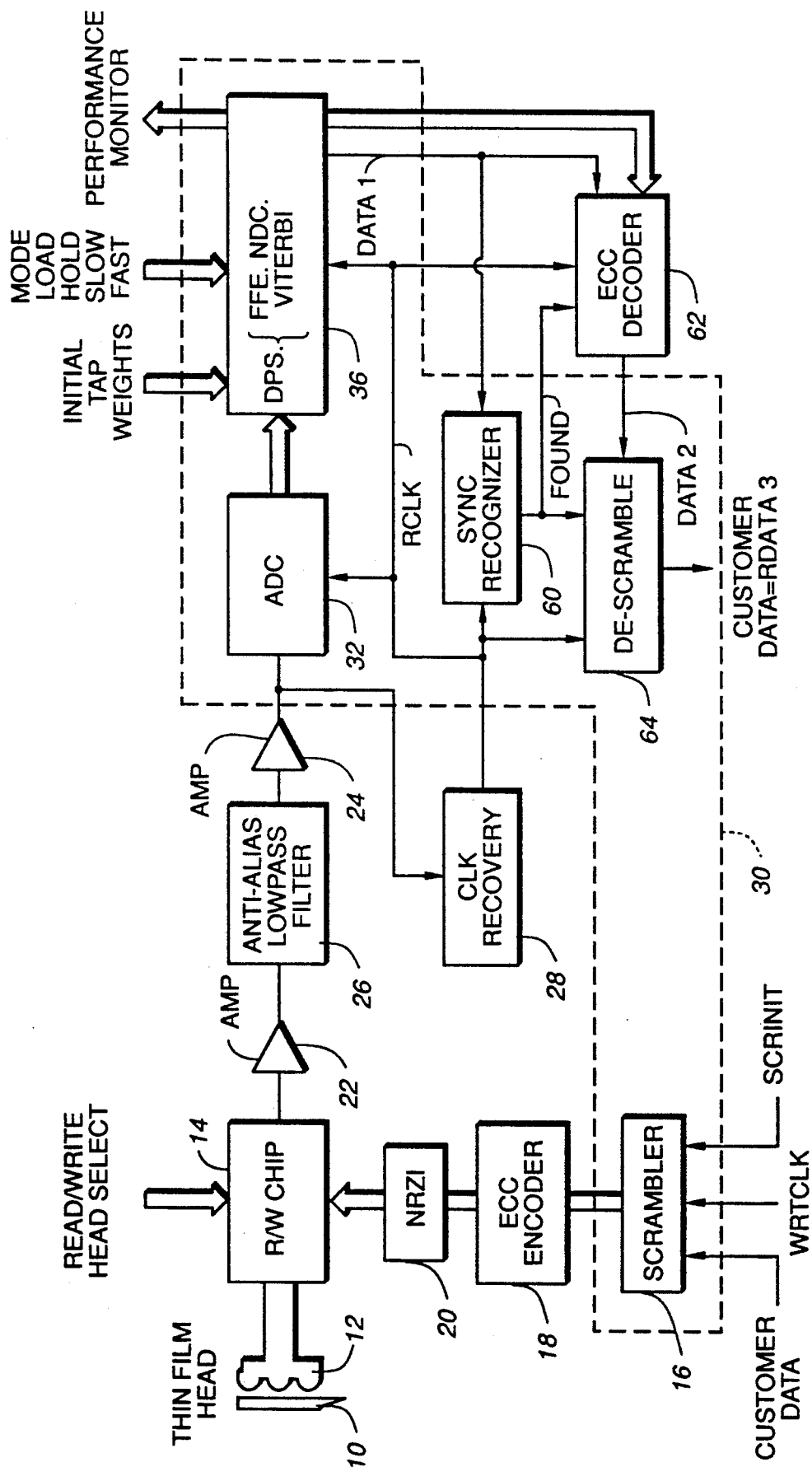
FIG._1

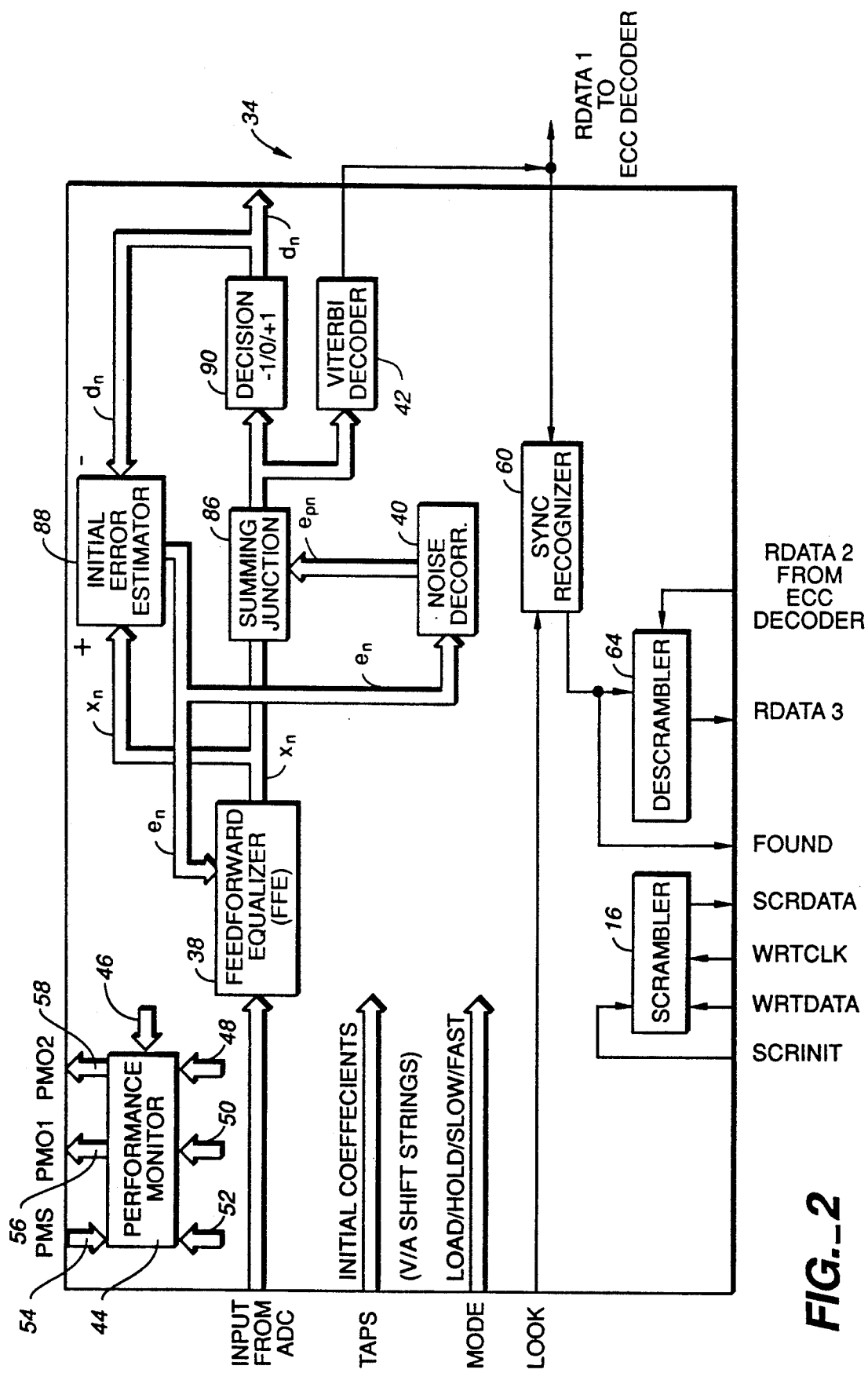
FIG._2

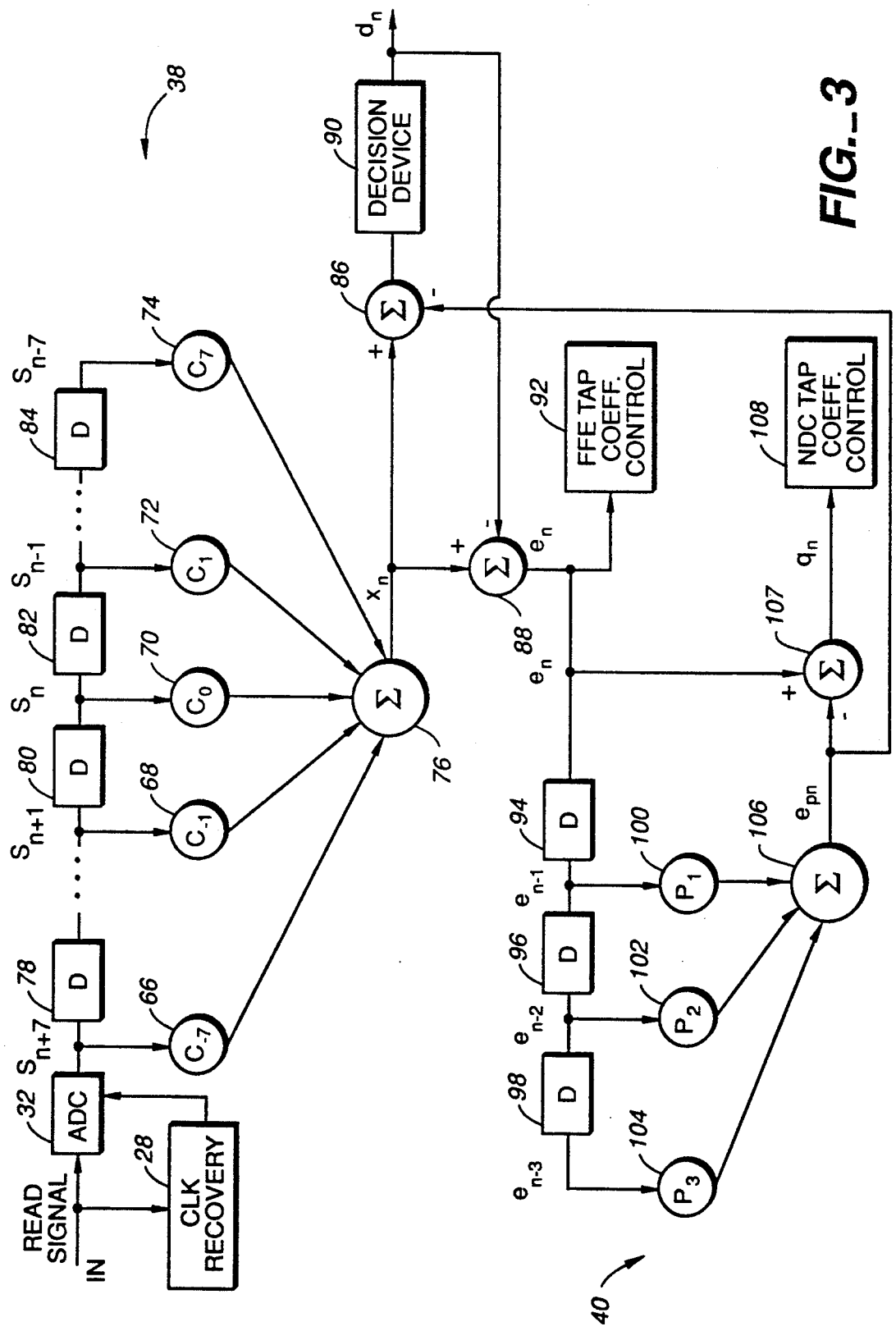
FIG._3

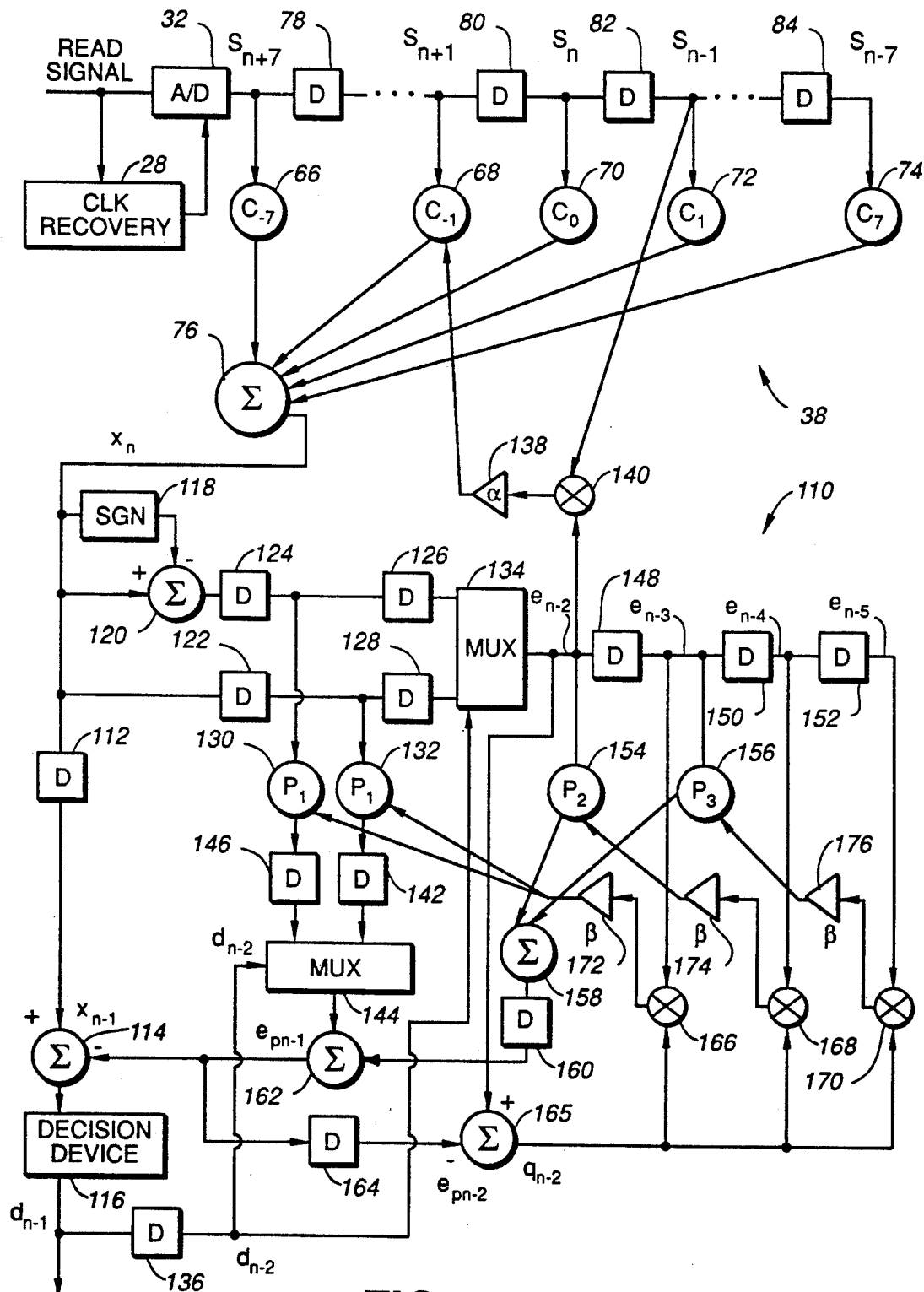
FIG._4

SIGNAL PROCESSING SYSTEM FOR ADAPTIVE EQUALIZATION

DESCRIPTION

1. Technical Field

The present invention relates generally to signal processing systems and more particularly to adaptive equalization for improving error rate.

2. Background Art

In signal processing systems, such as employed in magnetic recording and retrieval of information, data is encoded into a series of symbols. In pulse-coded modulation, readback symbols ideally have a limited number of amplitudes, e.g., −1, 0 and +1, at sample instants. However, all channels have non-ideal characteristics which cause various types of distortions. A distortion which is caused by overlapping of adjacent symbols is referred to as intersymbol interference. That is, intersymbol interference is the extension of a data symbol into a preceding or following symbol time.

To date, run-length-limited coding (RLL) has taken the place of nonreturn-to-zero coding in many mass storage systems. RLL codes are a mapping of a block of data bits into a block of code bits which are recorded on a disk. The period of a code bit is usually smaller than the period of a data bit. In magnetic disk recording, a reversal of disk magnetization occurs for each 1, but there is not such transition in magnetization for a 0. A readback signal has three types of symbols, no signal corresponding to no magnetization transition, a positive pulse corresponding to a negative to positive transition, and a negative pulse corresponding to a positive to a negative transition. A choice of RLL coding over other types of codings is made for the purpose of positioning magnetic transitions so that the amount of interaction between adjacent non-zero symbols is kept low. Disk-drive manufacturers use the RLL code referred to as a (d, k) code. The (d, k) code has a minimum of d and a maximum of k 0's between two consecutive 1's. The 0's act as barriers between adjacent 1's to minimize pulse interaction. The most commonly used (d, k) codes are (1, 7) and (2, 7) codes.

For RLL codes, having the minimum transition spacing greater than one data bit time spacing reduces intersymbol interference. However, there is an enhanced sensitivity to noise. For example, transition spacings of two different code sequences may differ by as little as ½ data bit symbol time spacing in (2, 7) coding. More generally, in digital data encoding and decoding methods, there is a compromise between reduction or intersymbol interference and noise susceptibility.

Additional complications arise because there typically are a number of disks and readback heads in a single drive. Each component will vary in its characteristics. Moreover, system response from an individual disk will change with changes in the radial position of a readback head.

It is an object of the present invention to provide a signal processing system which avoids the tradeoff between reduction of intersymbol interference and noise susceptibility. A further object is to provide such a system which allows an increase in data density and data rate with a given readback head and disk combination and which allows greater tolerance to manufacturing variations in these and other components.

SUMMARY OF THE INVENTION

The above objects have been met by a signal processing system for digital or analog signals in which the system has first adaptive circuits responsive to a first error signal for reducing intersymbol interference and has second adaptive circuits for reducing noise. The second adaptive circuits are responsive to an adjusting signal that is determined from the first error signal. By utilizing adaptive circuits to reduce intersymbol interference, rather than using an RLL code, data on a magnetic disk may be encoded using nonreturn-to-zero inverted encoding or class 4 partial response encoding, so that data density may be improved.

A feedforward equalizer has an input from a signal source and has a first summer which receives the outputs from each of the first adaptive circuits to provide an additive output having significantly less intersymbol interference. The means for adaptively adjusting the feedforward equalizer will be described below. The additive output is supplied to second and third summers. The second summer is positioned between the first summer and a decision device. The decision device converts the additive output into a stream of data samples having a limited number of predetermined amplitude levels, e.g., −1, 0 and +1. The stream is a second input to the third summer. The difference between the additive output from the first summer and the stream of data samples is the first error signal for adjusting coefficients of the first adaptive circuits of the feedforward equalizer.

The first error signal is channeled to a noise decorrelator having a plurality of taps operatively associated with the second adaptive circuits. The taps are arranged in a serial circuit having an input to receive the first error signal. The second adaptive circuits are each attached to a tap to multiply the signal level at the associated tap. A fourth summer adds the signals from the second adaptive circuits. This additive total is the output of the noise decorrelator and is an input to the second summer. That is, the second summer receives inputs from both the first summer and the fourth summer. The noise decorrelator functions to predict the noise level of the additive output of the feedforward equalizer and to compensate that additive output to reduce the average noise. The second adaptive circuits include coefficients which are continuously modified by a signal which is the difference between the output of the noise decorrelator and the first error signal.

In the preferred embodiment the source of the signal to the signal processing system is a hard magnetic disk having data that is nonreturn-to-zero inverted or pre-coded class 4 partial response encoded. An advantage of the present invention is that the system allows an improvement in data density over conventional RLL encoded systems by approximately 50%, since the increased intersymbol interference by higher recording density is reduced by the combination of the feedforward equalizer and the noise decorrelator, and since the noise susceptibility is also reduced by the selected coding. Another advantage is that the use of a feedforward equalizer in conjunction with a noise decorrelator allows greater latitude in manufacturing tolerances of components such as magnetic disks and readback heads. Moreover, the embodiments described below allow an increased system integration onto a single integrated circuit chip.

BRIEF DESCRIPTION OF THE DRAWINGS

FIG. 1 is a block diagram of a magnetic disk read/write assembly which includes a signal processing system in accord with the present invention.

FIG. 2 is a block diagram of the functions of the system of FIG. 1 which may be incorporated onto a single integrated circuit chip.

FIG. 3 is a first circuit embodiment of a signal processing system in accord with the present invention.

FIG. 4 is a second embodiment of a signal processing system in accord with the present invention.

BEST MODE FOR CARRYING OUT THE INVENTION

With reference to FIG. 1, a system is shown for reading and writing of data on a magnetic disk 10. The system includes a standard disk read/write integrated circuit chip 14 electrically connected to a thin film head 12. In writing, a scrambler 16 includes inputs of customer data, a write clock and resets to output scrambled data to be written on a sector of the magnetic disk 10. The scrambler processes the customer data with a pseudorandom sequence.

Error correction code (ECC) encoding is performed at block 18 after the scrambling in order to avoid error propagation in subsequent descrambling. Nonreturn-to-zero inverted (NRZI) encoding at block 20 provides a change in write current polarity of each 1 and no change in polarity for each 0 to the read/write IC chip 14. Use with class 4 partial response encoding is also possible.

A pair of amps 22 and 24 are positioned between an anti-aliasing filter 26. The output of the second amp 24 is received at a clock recovery circuit 28. The clock recovery circuit derives a coherent clock from the output of the amp 24.

The scrambling function at a block 16 and the functions of the system to be described below may be integrated into a single chip, with the exception of ECC decoding at block 62. Such a chip is represented by digital converter 30 in FIG. 1. Alternatively, an analog-to-digital converter 32 may be omitted from the chip 30 to provide the chip 34 shown in FIG. 2. Referring to FIGS. 1 and 2, the analog-to-digital converter 32 provides an input to a digital signal processing system (DPS) 36 that includes a feedforward equalizer (FFE) 38, a noise decorrelator (NDC) 40 and one or more Viterbi decoders 42. Inputs to the integrated circuit chip 34 include an 8-bit output from the external analog-to-digital converter (ADC), which is the readback signal sampled once per bit. Inputs common to both the shown integrated circuit chips 30 and 34 include the recovered clock (RCLK), initial coefficient values for the FFE 38 and the NDC 40 via a shift string, a mode input to the DPS 34, and the inputs to the scrambler 16.

Ideally, a performance monitor 44 is included to provide diagnostic information. The performance monitor may be able to give an early warning or system degradation. Internal signals will be presented to the performance monitor 44 at lines 46, 48, 50 and 52. Lines 46–52 may be coupled to tap coefficients of the feedforward equalizer 38 and the noise decorrelator 40, for example. Selection of a signal to be monitored is made via line 54, while the performance monitor outputs of internal signals being monitored are at lines 56 and 58.

A sync recognizer 60 receives a binary data output form the Viterbi decoder 42, as well as a signal from the clock recovery circuit 28 to set an ECC decoder 62 and a descrambler 64 to inform the decoder and descrambler as to when data begins. The descrambler 64 removes the effect of the scrambler 16 which was used in writing the customer data. In order to avoid error propagation in the descrambler, the ECC decoder 62 is positioned between the Viterbi decoder and the descrambler. The Viterbi decoder performs maximum likelihood decoding of information inputted to the Viterbi decoder from a summing junction 86 to be described below.

The digital processing system 36 of FIG. 1 is shown in greater detail in FIG. 2 and a first circuit embodiment of the system is shown in FIG. 3. The feed-forward equalizer 39 is a transversal filter having a tap delay line, 15 tap coefficients 66, 68, 70, 72 and 74 and a first summer junction 76. The tap delay line has a series of delays 78, 80, 82 and 84. Each tap coefficient is operationally associated with one delay and multiplies any signal at the associated delay, providing one of many inputs to the first summer junction 76. The many inputs to junction 76 are added to provide signal $X_n$. The tap coefficients are continually adjusted in a manner to be described below. Adjustment is made for the purpose of reducing interference of a data symbol with preceding or following symbols, i.e., reducing intersymbol interference.

The feedforward output $(X_n)$ is the sum of the multiplied inputs from the taps 78–84. That is, $$X_n = \sum_{i=-7}^{7} C_i S_{n-i}$$

where $C_i$ represents the adaptive value of the top coefficient number i and $S_{n-i}$ represents the signal level at the location along the tapped delay line associated with tap coefficient number i.

The output of the feedforward equalizer 38 is inputted to a second summing junction 86 and a third summing junction 88. The second summing junction 86 provides a signal to a decision device 90. The purpose of the decision device is to provide an estimate of an output data sample $d_n$. In a preferred embodiment, the output $d_n$ is a stream of data samples having signal levels of $-1$, 0 and $+1$. The output $d_n$ is used as an input to the third summing junction 88 for adaptively adjusting the tap coefficients 66–74 of the feedforward equalizer 38 to reduce intersymbol interference.

The third summing junction 88 determines the difference between the signal level of $X_n$ and the data sample level of $d_n$. For example, if $X_n$ is equal to $+0.9$, and $d_n$ is equal to $+1$, the third summing junction 88 provides the difference between $X_n$ and $d_n$, here $-0.1$. The output $(e_n)$ of the third summing junction 88 is a first error signal that is used at the feedforward equalizer 38 and the noise decorrelator 40 to adjust tap coefficients of the equalizer 38 in a least means error square sense and further to allow the noise decorrelator to reduce the average noise contained within the signal $x_n$ at some subsequent time. The third summing junction 88 is referred to as the initial error estimator in FIG. 2.

The first error signal $(e_n)$ from the third summing junction 88 is received at a tap coefficient control circuit 92 for the feedforward equalizer 38. The control circuit 92 adjusts the tap coefficients 66–74 so that at a time one clock cycle later $(n+1)$ the value of each tap coefficient $(C_i)$ is equal to the value of that tap coefficient at the current clock cycle (n) minus the product of a constant ($\alpha$) times the first error signal ($e_n$) times the signal level ($S_{n-1}$) at the delay 78–84 associated with the tap coefficient ($C_i$). That is, $$C_i^{(n+1)} = C_i^{(n)} - \alpha\, S_{n-i} e_n$$

The signal $e_n$ is also provided to the noise decorrelator 40. As noted above, the noise decorrelator serves the purpose of reducing the average noise at the output $X_n$ of the feedforward equalizer 38. The noise decorrelator takes advantage of the fact that the noise in the feed-forward equalizer output is highly correlated to subsequent noise. The decorrelator 40 structurally resembles the feedforward equalizer 38, having a plurality of delays 94, 96 and 98, a corresponding number of tap coefficients 100, 102 and 104, and a summing junction 106. Each delay element provides a one clock cycle delay. The additive output ($e_{pn}$) of the fourth summing junction 106 is a second error signal that is a prediction of the noise which is contained in the output ($X_n$) of the feed-forward equalizer. This output ($e_{pn}$) from the fourth summing junction is subtracted from the potentially noisy signal $X_n$ at the second summing junction 86. The value of the second error signal ($e_{pn}$) is the sum of the inputs from the tap delays 94–96 after multiplication by the tap coefficients 100–104, so that $$e_{pn} = \sum_{i=1}^{3} P_i e_{n-i}$$

In the same manner that the tap coefficients 66–74 are changed by the control circuit 92, the tap coefficients 100–104 of the noise decorrelator 40 are adjusted by the decorrelator tap coefficient control circuit 108. The decorrelator tap coefficient control circuit 108 is provided with a signal ($q_n$) determined at junction 107 as the difference between the first error signal ($e_n$) and the second error signal ($e_{pn}$). that is, the signal ($q_n$) is a third error signal for adjusting the tap coefficients of the decorrelator 40. The value at any tap coefficient ($P_i$) at a subsequent clock system ($n+1$) is equal to the value of the tap coefficient at the current clock cycle (n) minus the product of $\beta$ times the error signal ($q_n$) times the signal level ($e_{n-1}$) at the delay 94–98 associated with the tap coefficient ($P_i$). That is, $$P_i^{(n+1)} = P_i^{(n)} - \beta e_{n-i} q_n$$

the second embodiment of the system is shown in FIG. 4. The feedforward equalizer 38 is identical to the one described above. The noise decorrelator 110 of the embodiment of FIG. 4, however, is substantially different from the decorrelator described above.

The output $X_n$ from the first summing junction 76 is delayed one clock cycle at delay 112 prior to reaching a second summing junction 114 for input ($X_{n-1}$) to a decision device 116. As above, in a preferred embodiment the data ($d_{n-1}$) from the decision device 116 is a stream of data samples having a limited number of signal levels, e.g., $-1$, 0 and $+1$.

Parallel processing is provided by channeling signal $X_n$ to a sign circuit 118, a differential junction 120 and a delay 122. The sign circuit has an output limited to signal levels of $+1$ and $-1$. The polarity of the output from the sign circuit 118 corresponds to the polarity at the input. For example, an input of $+0.7$ will result in an output of $+1$. The differential junction 120 then would provide an output of $-0.3$ ($+0.7-1$). The delays 122 and 124 provide a clock cycle delay to a second pair of delays 126 and 128 and to a pair of functionally identical adaptive circuits, with the adaptive circuits having tap coefficients 130 and 132 of identical value ($P_i$).

At any particular clock cycle (n), the two signal levels at the inputs of the delays 122 and 124 represent the two possibilities of the first error signal ($e_n$) associated with a feedforward equalizer output ($X_n$) at that clock cycle. If the data sample ($d_n$) at that clock cycle (n) should be a zero, any signal at the input of the delay 122 is the first error signal. On the other hand, if the data sample ($d_n$) at clock cycle (n) should be $+1$ or $-1$, any signal at the input of the delay 124 is the correct first error signal. One of the two possibilities of the first error signal is subsequently selected, as will be described more fully below. But by providing parallel processing of the two possibilities at the early stages, it requires less serial operations for each clock cycle to obtain $d_n$ from $X_n$.

In the example given above, the signal levels from the delays 126 and 128 too a multiplexer 134 will be $-0.3$ from delay 126 and $+0.7$ from delay 128. At the multiplexer 134, one of the two possibilities of the first error signal is selected. The signal ($d_{n-1}$) from the decision device 116 is now ready to choose the correct first error signal. The signal $d_{n-1}$ is delayed at delay 136 and is utilized as a control input ($d_{n-2}$) to the multiplexer 134. The purpose of the delays described above is to match the timing of inputs to the multiplexer 134. If the control input $d_{n-2}$ is 0, the signal from the delay 128 is selected as the first error signal ($e_{n-2}$). The signal at the delay 126 is disregarded. On the other hand, if the control input $d_{n-2}$ is $+1$ or $-1$, the signal from the delay 128 is disregarded and the first error signal ($e_{n-2}$) is the level from delay 126.

The first error signal $e_{n-2}$ is utilized in the same manner described above to adjust the tap coefficients 66–74 of the feedforward equalizer 38. The amplifier 138 that provides the $\alpha$ amplification for the multiplication product of $S_{n-1}$ and $e_{n-2}$ provided by a multiplier 140. Note that the output of the amplifier 138 updates the tap coefficient 68 that is connected to the tap delay line at a point two delays prior to the signal $S_{n-1}$ at the output of the delay 82. A similar arrangement is provided for each of the tap coefficients 66–74. The arrangement compensates for the two clock cycle delay caused by delays 124–128. Thus, for each tap coefficient ($C_i$), the adjusted value at a time one clock cycle later ($n+1$) is equal to the value of the tap coefficient at the current clock cycle (n) minus the product of $\alpha$ times the signal level ($S_{n-2-i}$) times the first error signal $e_{n-2}$, or $$C_i^{(n+1)} = C_i^{(n)} - \alpha\, S_{n-2-i} e_{n-2}.$$

Parallel processing also occurs in the determination of a second error signal ($e_{pn-1}$). Two identical tap coefficients 130 and 132 are operatively associated with the delays 122 and 124. As will be explained more fully below, the second error signal ($e_{pn-1}$) is an additive output of a summing junction 162. An input to the summing junction 162 is one of the signals from the identical tap coefficients 130 and 132 after delay at 142 and 146. Again, the control input ($d_{n-2}$) from the delay at 136 is used to select the desired signal. At a particular clock cycle, if the control input ($d_{n-2}$) to a second multiplexer 144 is 0, the signal at the delay 142 is selected for input to the summing junction 162. On the other hand, if the control input is +1 or −1, the signal from delay 146 is selected as one input to the summing junction 136.

The remainder of the noise decorrelator 110 functions in much the same manner as the embodiment of FIG. 1. A multistep delay line has delays 148, 150 and 152 and has a tap coefficients 154 and 156. The first error signal $e_{n-2}$ is inputted to the multitap delay line. Outputs of the tap coefficients 154 and 156 are added at a summing junction 158. After a time-setting delay 160, the total from the summing junction 158 and the signal that was selected at the second multiplexer 144 are added at the summing junction 162 to provide the second error signal $e_{pn-1}$. The second error signal $e_{pn-1}$ is subtracted from the input $X_{n-1}$ to reduce the average noise contained within the input $X_{n-1}$.

A third error signal $q_{n-2}$ is utilized to adaptively adjust the tap weights 130, 132, 154 and 156 of the noise decorrelator 110. The third error signal is the difference between the first error signal $e_{n-2}$ and the second error signal $e_{pn-2}$ which is $e_{pn-1}$ delayed at 164 to properly time the arrival of signals at a summing junction 165.

The third error signal $q_{n-2}$ is coupled to each of three multipliers 166, 168 and 170 that multiply the outputs from the various taps on the delay line of the noise decorrelator 110. As described above, β amplifiers 172, 174 and 176 provide further multiplication prior to updating the respective tap coefficients 130, 132, 154 and 156. Thus, the value of any tap coefficient ($P_i$) at a clock cycle (n+1) is $$P_i^{(n+1)} = P_i^{(n)} - \beta e_{n-2-i} q_{n-2}$$

where i represents the index number of the tap coefficient.

While the present invention has been described and illustrated as being used in signal processing systems for digital signals, the invention is equally applicable in analog signal processing systems.

We claim:

1. A signal processing system for data signals subject to noise and intersymbol interference comprising:
   equalizer means for processing a data signal to provide reduction of intersymbol interference, said equalizer means having a plurality of first adaptive circuits responsive to a first error signal,
   decision means coupled to said equalizer means for converting said processed data signal into a stream of data samples,
   first error means for generating said first error signal as a function of a difference in signal level between said stream of data samples and said processed data signal, said first error means connected to said first adaptive circuits of said equalizer means for adjustment thereof, and
   noise predicting means for processing said first error signal to predict noise in said processed data signal, said noise predicting means having a plurality of signal delay taps and second adaptive circuits, said signal delay taps having an input to receive said first error signal, said noise predicting means having an output which is a second error signal generated as a cumulation of signal delay tap outputs weighted by said second adaptive circuits, said output coupled between said equalizer means and said decision means for providing compensation of a signal level to said processed data signal,
   said decision means thereby being less susceptible to error due to a noise.

2. The system of claim 1 further comprising source means for providing said data signal to said equalizer means, said source means including a magnetic read head.

3. The system of claim 1 further comprising a summing means for generating an adapting signal as a function of the difference in level between said first and second error signal, said adapting signal coupled to said second adaptive circuits for adaptive adjustment of said second adaptive circuits.

4. The system of claim 1 wherein said equalizer means is a feedforward transversal equalizer having a delay line having a plurality of taps, each tap operatively associated with one of said first adaptive circuits.

5. The system of claim 1 further comprising source means for providing said data signal in one of a non-return-to-zero inverted code and a class 4 partial response code.

6. A signal processing system for data signals subject to noise and intersymbol interference comprising:
   equalizer means for processing a data signal to provide reduction of intersymbol interference, said equalizer means having a plurality of first adaptive circuits responsive to a first error signal,
   decision means coupled to said equalizer means for converting said processed data signal into a stream of data samples,
   first error means for generating said first error signal as a function of a difference in signal level between said stream of data samples and said processed data signal, said first error means connected to said first adaptive circuits of said equalizer means for adjustment thereof,
   noise predicting means for processing said first error signal to predict noise in said processed data signal, said noise predicting means having a plurality of taps and second adaptive circuits, said taps having an input to receive said first error signal, said noise predicting means having an output which is a second error signal generated as a cumulation of tap outputs weighted by said second adaptive circuits, said output coupled between said equalizer means and said decision means for providing compensation of a signal level to said processed data signal, and
   parallel circuit paths from said equalizer means to said first error means, said parallel circuit paths including a first path for a signal symbol having a signal level to be converted to a zero level by said decision means and including a second path for a signal symbol having a signal level to be converted to a non-zero level by said decision means,
   said decision means thereby being less susceptible to error due to noise.

7. The system of claim 6 wherein said first error means includes a multiplexer having inputs from said first and second paths and having a control input from said decision means.

8. The system of claim 6 wherein said second path includes a first circuit line to a differential means and includes a second circuit line having sign circuit means for setting an incoming signal symbol at a predetermined level, said differential means having an input from said sign circuit means for determining the difference in level between said first and second circuit lines.

9. A signal processing system for reducing error due to intersymbol interference and other noise comprising,
a source of a data signal,
a transversal equalizer having a plurality of first taps operatively associated with first adaptive multipliers that are responsive to a first error signal to reduce intersymbol interference, said equalizer having an output means for providing a processed data signal corresponding to cumulations of signal levels of said first adaptive multipliers,
decision means coupled to said output means for converting said processed data signal to a stream of samples having a limited number of predetermined signal levels,
first error means for generating said first error signal by determining the difference in signal level between said processed data signal from said output means and a sample in said stream of samples from said decision means,
a noise decorrelator having a plurality of second taps operatively associated with a plurality of second adaptive multipliers that are responsive to an adjusting signal, said second taps arranged in a serial circuit having an input to receive said first error signal, said noise decorrelator having a first summing means connected to said second adaptive multipliers for cumulating output products from said second adaptive multipliers, thereby providing a second error signal,
second summing means connected between said transversal equalizer and said decision means for compensating the level of said processed data signal as a function of said second error signal, and
third summing means for generating said adjusting signal as a function of the difference in level between said first error signal and said second error signal.

10. The system of claim 9 wherein said connection between said transversal equalizer and said first error means is a parallel circuit having first and second circuit paths, said first circuit path connected to said first error means for presenting said processed data signal to said first error means as a first input, said second circuit path including means for determining the difference in signal level between said processed data signal and a predetermined signal level of input to said first error means, said first error means being a switching means controlled by said stream of samples from said decision for choosing one of said inputs from said first and second circuit paths.

11. The system of claim 9 wherein said source of a data signal includes a magnetic disk having an absence of training sequences.

12. The system of claim 9 wherein each second adaptive multiplier is operatively associated with circuitry to provide an output product determined by $$P_i^{(n+1)} = P_i^{(n)} - \beta e_{n-i} q_n,$$

wherein $P_i^{(n+1)}$ is the adaptive multiplier at a time $n+1$ clock cycles, $P_i^{(n)}$ represents a previous adaptive multiplier obtained at time n, $\beta$ represents a constant, $e_{n-i}$ represents said first error signal present at the associated tap, and $q_n$ represents the adjusting signal.

13. The system of claim 9 wherein said source is a source of a digital signal.

14. A signal processing system comprising,
a source of an encoded signal,
adaptive equalizer means, operatively associated with said source, having a plurality of first adaptive circuits responsive to a first error signal for equalizing said encoded signal to provide reduction of intersymbol interference,
decision means coupled to said equalizer means for converting said equalized signal into a stream of data samples having a limited number of predetermined signal levels including a zero data sample level and at least one non-zero data sample level,
parallel processing circuitry to provide said first error signal, said circuitry including parallel circuit paths having inputs coupled to said equalizer means to receive said equalized signal and having outputs representing alternative assumed first error signals for selection of said first error signal, said circuitry further including switching means for selecting one of said alternative assumed first error signals, said switching means having a control input coupled to receive said stream of data samples, said parallel circuit paths including a first path having an output assuming a zero data sample level at said control input and including a second path having an output assuming a non-zero data sample level at said control input, said second path having sign circuit means for providing an adjusted equalized signal having signal levels limited to said predetermined non-zero data sample levels, said second path having differential means for providing a differential signal representing the difference between said adjusted equalized signal and said equalized signal,
a noise decorrelator having a plurality of taps operatively associated with adaptive multipliers responsive to an adjusting signal, said taps arranged in a serial circuit having an input to receive said first error signal, said noise decorrelator having a first summing means connected to said adaptive multipliers are cumulating output products from said adaptive multipliers, thereby providing a second error signal,
second summing means connected between said equalizer means and said decision means for adding the level of said second error signal to said equalized signal from said equalizer means, and
third summing means for generating said adjusting signal by determining the difference in level between said first error signal and said second error signal.

15. The system of claim 14 wherein said source includes a magnetic disk and a magnetic read head.

16. The system of claim 15 wherein said source includes an analog-to-digital converter disposed between said magnetic read head and said equalizer means.

* * * * *